Oct. 16, 1951     P. T. NIMS     2,571,284
POWER TRANSMISSION

Filed July 6, 1946     3 Sheets—Sheet 1

INVENTOR.
Paul T. Nims.
BY
Harness and Harris
ATTORNEYS.

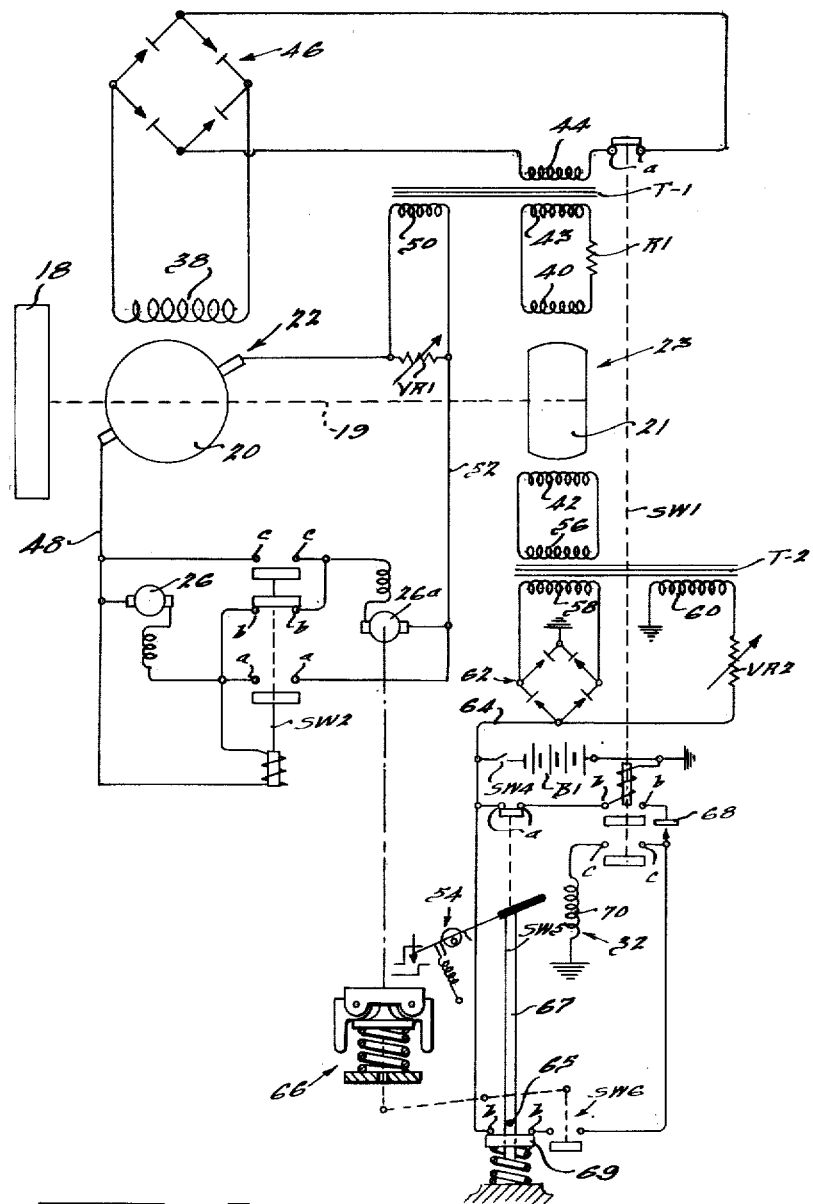

Patented Oct. 16, 1951

2,571,284

UNITED STATES PATENT OFFICE 2,571,284

POWER TRANSMISSION

Paul T. Nims, Detroit, Mich., assignor to Chrysler Corporation, Highland Park, Mich., a corporation of Delaware Application July 6, 1946, Serial No. 681,630

24 Claims. (Cl. 290—17)

1

This invention relates to electrical controlling systems and more particularly to a system for driving a motor vehicle.

The principal objects of the present invention are to provide a system of the aforesaid type which is simple in arrangement, requiring a minimum number of structural elements, is relatively light in weight and is reliable and efficient in operation; to provide a combined electrical and mechanical driving system in which the electrical system shares the load during certain periods of operation; to provide a motor vehicle driving system which is operable to provide fast acceleration and high power and yet have a favorable economy operation at a cruising speed; to provide such a system which is used for starting a vehicle from rest or when large amounts of output torque are desired; to provide such a motor vehicle driving system whereby at cruising speeds the electrical system is ineffective, thereby eliminating all electric power losses.

With the above, as well as other and more detailed objects, in view, which appear in the following description and in the appended claims, preferred but illustrative embodiments of the invention are shown in the accompanying drawing throughout the several views of which corresponding reference characters are used to designate corresponding parts and in which:

Fig. 2 is a schematic diagram of the electrical circuit for the drive shown in Fig. 1;

Figure 1:
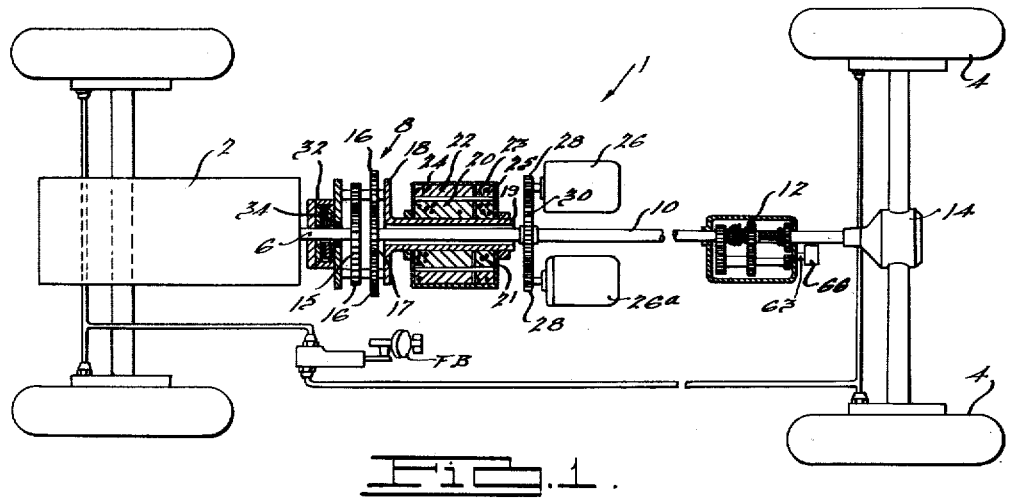
Fig. 1 is a diagrammatic view of a vehicle chassis embodying the invention.

Referring to the drawings, the numeral 1 designates generally a motor vehicle chassis having the usual internal combustion engine 2 connected for driving the rear wheels 4 of the vehicle. The engine 2 has an output shaft 6 driving a double planetary-type gear train generally designated 8 which drives a propeller shaft 10 connected through a transmission mechanism 12 and a differential mechanism 14. An input sun gear 15 is driven by shaft 6 and drives planet gears 16 of the planetary gear train 8 which mesh with the sun gear 15 and an output sun gear 17 secured to the shaft 10 and of lesser diameter than sun gear 15. The planet gears 16 are journaled in a rotatable spider 18 which has a portion 19 extending concentrically with the propeller shaft 10 for driving the rotors 20 and 21 of an electric generator 22 and an exciter 23 respectively having stators 24 and 25 suitably held against rotation by means

2 not shown. The electrical output of the generator 22 is controlled by the exciter 23 and is transmitted by a control circuit such as is shown in Fig. 2 for driving a pair of electric motors 26 and 26a each having output pinions 28 meshing with a gear 30 suitably secured to the propeller shaft 10. An electrically operated clutching mechanism 32 selectively couples the spider 18 directly to the output shaft 6 of the engine 2 to provide a direct drive from the engine 2 to the propeller shaft 10. An overrunning clutch 34 is provided between the shaft 6 and spider 18 to prevent rotation of the spider 18 at a slower rate than the shaft 6.

A pair of alternating current output coils 40 and 42 are carried by the stator 25. The output coil 40 is connected through a resistor R–1 to a primary coil 43 of a saturable core-type transformer T–1. The secondary or output coil 44 of the transformer T–1 has one terminal thereof connected directly to one alternating current terminal of a bridge-type full-wave rectifier 46, and its other terminal is connected through contacts $a$ of a magnetically operable switch SW1 to the other alternating current terminal of the rectifier 46. The direct current terminals of the rectifier 46 supply the field coil 38 of the stator 24 associated with the rotor 20. One terminal of the rotor 20 is connected to a power bus 48, while the other terminal is connected through the saturating coil 50 of the transformer T–1 to the other power bus 52. In order that current through the winding 50 may be proportioned to provide the desired saturating characteristics, a variable resistor VR1 is connected in shunt across the coil 50, and is so adjusted that with the engine 2 delivering maximum horsepower at full open throttle, the generator 22 is delivering its rated horsepower output. Within the normal operating speeds of the generator 22 the saturating coil will act to maintain the output substantially constant, as is more fully described in my copending application Serial No. 643,803, filed January 26, 1946, for Electronic Drive.

The motor 26 is directly connected to the bus 48 and to the left-hand ones of contacts $a$ and $b$ of a magnetically operable switch SW2. The motor 26a is connected directly to the bus 52 and to the right-hand ones of the said contacts $b$ and $c$ of the switch SW2. The left-hand contact $c$ and right-hand contact $a$ of the switch SW2 are directly connected respectively to the buses 48 and 52. The actuating coil of the switch SW2 is connected in shunt across the motor 26 and is so arranged that when the voltage drop or counter E. M. F. of the motor 26 is below a predetermined voltage, for example 50 volts, the contacts b of switch SW2 will be closed and the contacts c and a open so that the motors 26 and 26a will be serially connected between the buses 48 and 52. As the counter E. M. F. of the motor 26 increases to a value above 50 volts, the switch SW2 will be actuated and the contacts a and c closed and the contacts b opened so that the two motors 26 and 26a are connected in parallel between the buses 48 and 52.

The exciter 23 has its battery charging coil 42 directly connected to a primary winding 56 of a saturable-core-type transformer T-2 having a secondary winding 58 and a saturating winding 60. The terminals of the winding 58 are directly connected to the alternating current terminals of a full wave bridge-type rectifier 62 having one of its direct current terminals grounded and the other of its direct current terminals connected to one terminal of a battery B1 through a switch SW4 which is preferably operated with or which may be the ignition switch for the engine 2. This same direct current terminal of the rectifier 62 is connected through a variable resistor VR2 to one terminal of the saturating winding 60 having its other terminal grounded.

The structure of Fig. 2 thus far described is more completely described and claimed in my said copending application Serial No. 643,803, with the exception that herein is disclosed a pair of motors 26 and 26a which may be operated either in series or parallel relationship.

Energization of the generator 22 and the clutch 32 is controlled by switch SW1 having its actuating coil connected across the battery B1 through contacts a of a throttle-controlled switch SW5. Bus 64 connected to the nongrounded side of the battery B-1 is connected through the contacts b of the switch SW5 and the contacts of a governor-controlled switch SW6 operated by a flyball governor mechanism generally designated 66 driven by the motors 26 and 26a, or, as is more particularly shown in Fig. 1, by the idler gear of the transmission unit 12 as by shaft 63. From the switch SW6 the circuit is continued to the right-hand one of the contacts c of the switch SW1 and through a rectifier 68 to the right-hand contact b of the switch SW1. One terminal of the actuating element 70 of the electrically actuated clutch 32 is grounded and the other terminal connected to the left-hand contact c of switch SW1.

Lost motion means such as a pin 65 carried by the operating shaft 67 of the switch SW5 and normally spaced from the bar 69 for closing contacts b thereof is provided so that the contacts b will remain closed until the throttle 54 has been opened a predetermined amount, which may be wide-open throttle position.

Figure 3:
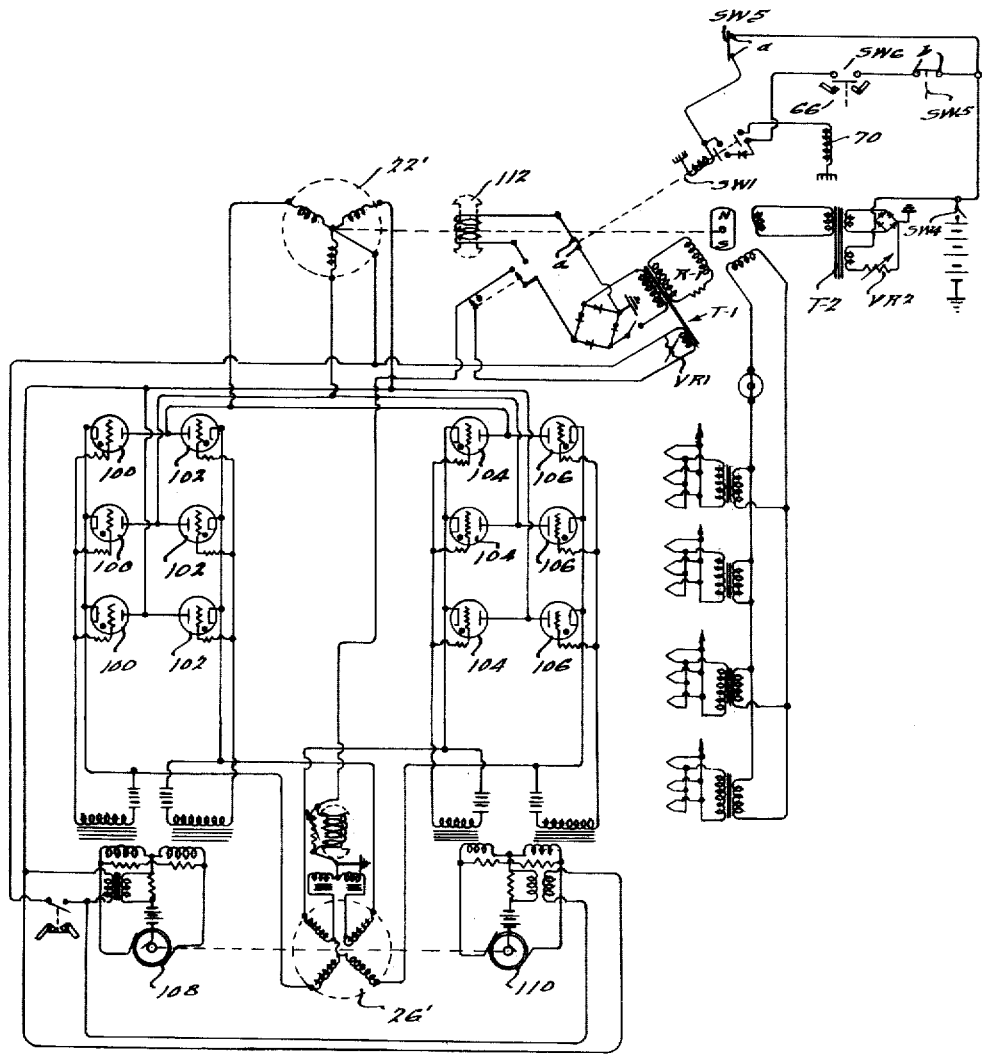
Fig. 3 is a schematic diagram showing a modified form of an electric circuit.

In Fig. 3 I have shown an arrangement similar to that shown in my copending application Serial No. 643,803 whereby the motor 26' may be driven by alternating current as from an alternator 22'. Since this circuit, with certain exceptions, which will be hereinafter pointed out, is identical with that disclosed and claimed in my copending application, it is deemed unnecessary here to give a complete and detailed description thereof, it being necessary merely to broadly define its operating principles for the understanding of the present invention. Power generated by the alternator 22' is transmitted through the electronic valves of the groups of valves 100, 102, 104, and 106 to the phase coils of the alternating current motor 26'. Return current to the alternator 22' flows through a controlling network, including the saturating coil of the transformer T1, to the common terminal of the phase coils of the alternator 22' for controlling the alternator so that the product of the output current and voltage is held constant within the normal speed operating range of the alternator 22'. Commutators 108 and 110 are respectively driven by the shaft of the motor 26' whereby the groups of valves 100, 102, 104, and 106 are sequentially and alternately rendered conductive to provide polyphase current for operation of the motor 26'. To the aforesaid system of my copending application Serial No. 643,803 I have added herein a controlling switch SW1 which controls the flow of energizing current to the rotating field 112 and the energization of the clutch element 70. A governor-actuated switch SW6 and a throttle-controlled switch SW5 having the contacts a and b are provided and co-operate in the same manner as their counterparts in the circuit of Fig. 2 of this application to provide a control system to de-energize the alternator and energize the clutch 32 for cruising operation of the vehicle 1, as will be more fully explained hereinafter.

Figure 4:
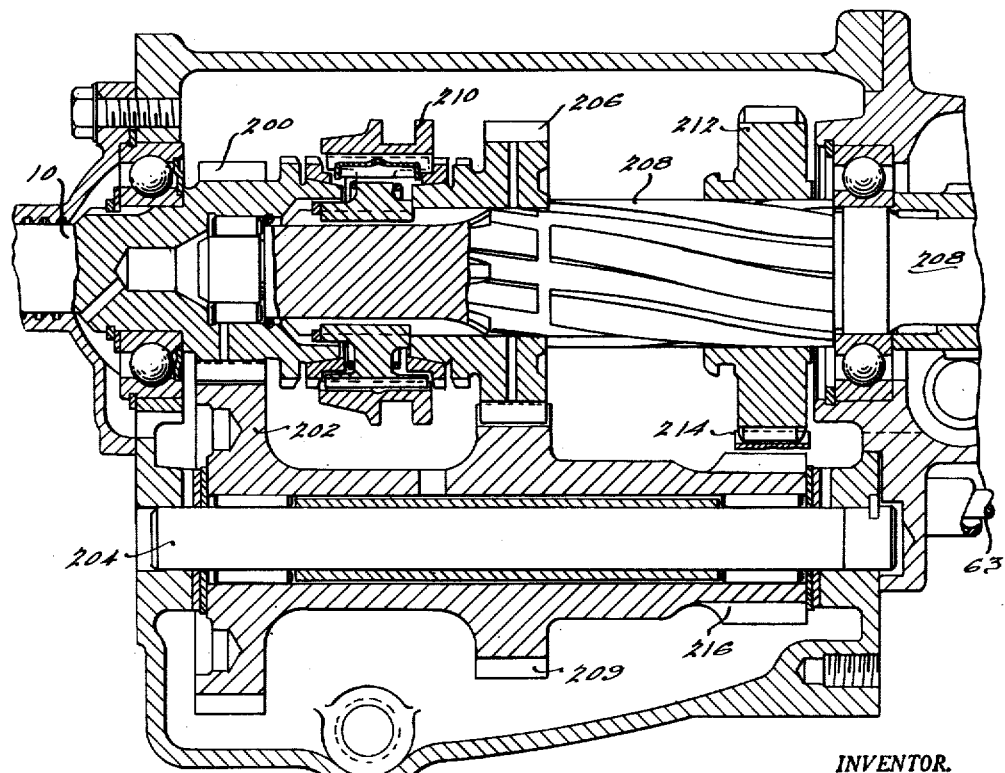
Fig. 4 is an enlarged sectional view of a transmission adapted for use with the electric drive.

In Fig. 4 there is shown a transmission whereby the gear ratios between the propellor shaft 10 and the axle for driving the rear wheels 4 may be varied so as to provide extra torque for climbing steep hills. Generally speaking, torque is transmitted by the shaft 10 to the gear 200 which is constantly in mesh with gear 202 rotatable about the lay shaft 204. Gear 206 is journaled about the output shaft 208 of the transmission unit and is in constant mesh with a gear 209 integral with gear 202. A coupling member 210 selectively couples the shaft 208 to either the gear 200 for direct drive by the shaft 10 or to the gear 206 for drive at a reduced ratio through gears 202 and 209. Member 210 may also be held in a neutral position as shown and gear 212 moved along the splined shaft 208 to mesh with an idler gear 214 in constant mesh with gear 216 integral with gears 202 and 209 for reversing the rotation of shaft 208 with respect to shaft 10 whereby the vehicle may be driven in the reverse direction. The governor 66 shown in Fig. 1 is preferably directly driven by gear 214.

The operation of the vehicle drive is as follows: When it is desired to start the engine 2, the switch SW4 is closed, which energizes the coil of the relay SW1, opening the contacts a and closing the contacts b and c thereof. Closure of the contacts b and c is without effect at this time, because the governor-controlled switch contacts SW6 are in open circuit position, and rectifier 68 prevents reverse flow of current. The engine now having been started with the throttle in the idling position as shown, the shaft 6 rotates the sun gear 15. Since sun gear 17 is not at this time rotating due to the holding torque exerted by the wheels 4, the planet gears 16 rotate about their own axes and bodily about the sun gear 17. This bodily rotation of the planet gears 16 causes the spider 18 and attached rotors 20 and 21 to rotate. The throttle 54 is now moved clockwise toward open position, opening the contacts a of switch SW5, which de-energizes the control coil of switch SW1, allowing the contacts a thereof to close and the contacts b and c thereof to open. At the same time, the switch SW3 of the dynamic braking system will also open, preventing any flow of current through the resistors R2 and R3. Contacts a of switch SW1 now being closed, field coil 38 becomes energized and rotation of the rotor 20 will exert a torque opposing rotation of the spider 18. Since the ratio of the torques exerted by the spider 18 and output sun gear 17 are independent of speed and fixed entirely by the relative number of teeth of the gears 16 and 17, a torque will be applied to the shaft 10 proportional to the torque supplied to the spider by the rotor 20.

At the time the contacts a of switch SW1 closed to energize the field winding 38, the throttle 54 was just beginning to be opened from idling position and the rotors 20 and 21 were being rotated at about 800 R. P. M., assuming the idling speed of the engine to be about 400 R. P. M., which is considerably below its normal operating speeds. At this speed the exciter is unable to generate a high enough voltage to fully energize the field winding 38, and the output of the generator 22 is below its rated power output. It should be remembered at this point that the saturating winding 50 is operable only to reduce the current supplied to the winding 38 so that the generator 22 operates at substantially constant power output only above a predetermined minimum speed and within its normal operating speed range. Since the power output of the generator is low it will exert only a relatively low torque opposing rotation of the spider 18, and consequently a low torque is exerted on the shaft 10. As the throttle 54 is opened further, the speed of the engine increases, increasing the speed of the rotors 20 and 21 and the power output of the generator 22 with a consequent increase of opposing torque exerted on the spider 18, because the power output of the generator 22 is increasing with the increased speed. The generator output is absorbed by the motors 26 and 26a which are geared to the shaft 10 so that the total torque available to drive the shaft 10 is equal to that transmitted thereto by the output sun gear 17 and motors 26 and 26a. At some throttle opening, depending upon the torque necessary to rotate the wheels 4, the vehicle 1 will begin to move. As the vehicle speed increases, the ratio between engine speed (shaft 6) and generator speed (spider 18) decreases from the 1-to-2 ratio which was assumed to exist with shaft 10 not rotating to approximately a 1-to-1 ratio which exists when the generator 22 is operating within the speed range in which the saturating coil 50 acts to maintain the power output of generator 22 constant. The overrunning clutch 34 acts to prevent the spider 18 from running at a lower speed than the shaft 6, preventing a further reduction of the ratio beyond 1 to 1. The road speed of the vehicle 1 at this time will be somewhat above 16 miles per hour at which speed the governor 66 acts to close the switch SW6 preparing the holding circuit of the magnetically operated switch SW1 and the clutch circuit from the battery B1, the bus 64, contacts b of switch SW5 (which are closed at all times except when the throttle 54 is at its extreme open position at which time pin 65 thereof opens the contact closing bar 69 thereof), now closed governor switch SW6 the right-hand contact c of the switch SW1, and rectifier 68 to the right-hand contact b of switch SW1. The throttle 54 is now momentarily moved to idling position, at which time contacts a of switch SW4 are closed to energize the coil of switch SW1 which causes contacts a and contacts b and c of switch SW1 to be opened and closed respectively. Opening of the contacts a de-energizes the winding 38 of generator 22, rendering it ineffective. Closure of contacts b completes the holding circuit for the switch SW1 to maintain the coil thereof energized. Closure of contacts c energizes the controlling element 70 of clutch 32 to couple the spider 18 to the shaft 6 for direct drive from the shaft 6 to shaft 10. The vehicle is now operated under cruising conditions without electrical losses. The losses due to rotation of the motors 26 and 26a and generator 22 are negligible so that a very economical cruise condition is possible.

At the instant of start the motors 26 and 26a will be stationary, and the counter E. M. F. thereacross will be very low and consequently the current flow therethrough high. As the motors 26 and 26a begin to turn, the counter E. M. F. builds up and when it has obtained a predetermined speed as reflected by a predetermined counter E. M. F., as, for example, 50 volts, the coil of the switch SW2 will be sufficiently energized to close the contacts c and a thereof and open the contacts b thereof to place the motors 26 and 26a in parallel operation.

The vehicle will continue to operate under cruising conditions until such time as the speed of the vehicle 1 as reflected by the governor 66 becomes sufficiently low, say 16 M. P. H., so that the governor switch SW6 is open to de-energize the coil of the switch SW1 and close the contacts a thereof and open the contacts b and c thereof, at which time the electric drive would then be rendered operable. If, without reaching this predetermined minimum speed, it is desired to operate the vehicle through the electric drive, as, for example, to pass another vehicle on the highway or to ascend a steep incline, it is necessary merely to move the throttle 54 to wide-open position, at which time the lost motion of the switch SW5 is taken up and the contacts b thereof are opened. This de-energizes the actuating coil of the relay SW1 and the element 70 as if the switch SW6 has been opened. When it is again desired to go back into straight mechanical drive, the throttle 54 is momentarily moved to idle position, at which time the contacts a of the switch SW5 are momentarily closed, energizing the actuating coil of the relay SW1, causing the contacts b thereof to close a holding circuit and the circuit of element 70 as hereinbefore set forth.

During normal operation of the vehicle 1 the transmission mechanism 12 is arranged with the member 210 coupled to the gear 200 for 1–1 drive therethrough. If, however, a higher torque is required to drive the vehicle 1 for one reason or another, then the member 210 may be coupled to the gear 206 for a reduced ratio drive. For backing of the vehicle the member 210 is placed in a neutral position and the gear 212 placed in mesh with the idler gear 214, as shown in Fig. 4.

When it is desired to stop or slow down the vehicle 1, the throttle 54 is moved to closed position. Contacts a of switch SW4 will be closed, energizing the switch SW1 to open the contacts a thereof, deenergizing the generator 22. Then the usual friction brake-actuating element FB is operated and the usual friction brakes are used.

The system of Fig. 3 operates in the same manner as described in connection with Fig. 2 to regulate the excitation of the alternator 22' and energize the clutch 32 for driving the vehicle 1 by means of the switches SW1, SW4, SW5, SW6 controlled directly or indirectly by the governor 66 and throttle 54. In Fig. 3, however, alternating current is used in connection with electronic valves whereby the motor 26' is provided with a voltage of the frequency required to drive the motor 26' irrespective of the voltage frequency delivered by the alternator 22' as is completely described in my said copending application Serial No. 643,803.

In accordance with the patent statutes preferred embodiments of the invention have been described in detail; however, it will be appreciated that various modifications in the form, number, and arrangement of the parts may be made without departing from the spirit and scope of the invention which is to be limited only by the scope of the appended claims.

What is claimed and is desired to be secured by United States Letters Patent is:

1. A drive shaft driven automotive transmission system comprising mechanical gear type transmission means including a planetary system incorporating two adjacent and coaxial sets of gears, each said gearset having a sun gear and planetary gears, a carrier carrying the planetary gears of both gearsets connected to one another, said system having two drive shaft connected portions and two driven portions, one of said drive shaft connected portions and one of said driven portions being connected to said carrier, the other drive shaft connected portion being connected to one of the sun gears and the other driven portion being connected to the other sun gear, electrical generating means connected to one of said driven portions, and electric motor means adapted to be powered by said generating means and operatively connected to the other of said driven portions to deliver torque thereto.

2. In a power-transmitting system, a planetary-type gear train having an input member adapted to be driven by a source of power and an output member adapted to drive a load and a part driven by the reactive torque of said gear train, an electric generating means driven by said driven part, electric motor means adapted to be driven by said generating means for delivering power to said output member and having circuit means for interconnecting the generating means and electric motor means, and exciter circuit means for the generating means, said exciter circuit means having control means associating it with the first-named circuit means in inverse interdependence upon the output of the generating means as transmitted by the first-named circuit means whereby said generating means output power is maintained substantially constant at speeds above a predetermined minimum irrespective of changes in the speed of said driven part.

3. A drive shaft driven automotive transmission system comprising mechanical gear type transmission means including a planetary system incorporating two adjacent and coaxial sets of gears, each said gearset having a sun gear and planet gears, a carrier carrying the planet gears of both gearsets connected to one another, said system having two drive shaft connected portions and two driven portions, one of said drive shaft connected portions and one of said driven portions being connected to said carrier, the other drive shaft connected portion being connected to one of the sun gears and the other driven portion being connected to the other sun gear, electrical generating means connected to one of said driven portions, electric motor means adapted to be powered by said generating means and operatively connected to the other of said driven portions to deliver torque thereto, and a mechanical underdrive transmission operatively connected to said other driven portion and adapted to deliver power therefrom to a propeller shaft.

4. A drive shaft driven automotive transmission system comprising mechanical gear type transmission means including a planetary system having a gear unit incorporating two adjacent and coaxial sets of gears, said gearsets having planet gear means and a common carrier carrying the planet gear means, and each gearset further having a sun gear connected to the other sun gear through the planet gear means carried by the common carrier, said system having a first drive transmitting portion connected to said drive shaft, two driven portions one connected to said carrier, and the other connected to one of the sun gears and a second drive transmitting portion, one of said drive transmitting portions being connected to said carrier, and the other drive transmitting portion being connected to the other sun gear, electrical generating means connected to one of said driven portions, electric motor means adapted to be powered by said generating means and operatively connected to the other of said driven portions to deliver torque thereto and a direct drive clutch engageable to hold the two named drive transmitting portions against relative rotation.

5. In a variable torque power transmission system, torque dividing means having a plurality of members including rotatable input and output members and a rotatable torque controlling member establishing an engaged relation respectively therebetween, electric power generating means for applying a torque to said controlling member proportional to the torque delivered by said input member to said output member, said torque dividing means having one-way means disposed between certain of its members and engageable to prevent change in direction of relative rotation of said torque controlling member and means including electric motor means for supplying said generated power to said output member whereby the torque delivered to said output member by said input member is supplemented.

6. In a variable torque power transmission system, torque dividing means having rotatable input and output members and a rotatable torque controlling member, electric power generating means for applying a torque to said controlling member proportional to the torque to be delivered by said input member to said output member, a pair of series-connected electric motors connected in series with said generating means and operatively connected to said output member for supplying torque thereto, and means operable in accordance with a predetermined minimum speed of rotation of said motors to place said motors in parallel across said generating means.

7. In a variable torque power transmission system, torque dividing means having rotatable input and output members and a rotatable torque controlling member, an electric generating means rotatable by said torque controlling member, and having a field adapted to be energized, electric motor means operatively connected to said output member for supplying torque thereto and having circuit means adapting the electric motor means for connection to the generating means for being driven thereby, control means associated with said circuit means so as to be sensitive to the output of said generating means as transmitted by the circuit means, said control means being arranged to control the energization of the field of said generating means inversely with respect to the output of said generating means and thus controlling the output of said generating means whereby within the normal operating range the product of the output voltage and current of said generating means is maintained substantially constant irrespective of changes in the rate of rotation of said generating means.

8. In a variable torque power transmission system, torque dividing means having rotatable input and output members and a rotatable torque controlling member, an electric generating means rotatable by said torque controlling member, means controlling the output of said generating means whereby the product of its output voltage and current is maintained below a predetermined maximum value irrespective of the rate of rotation of said generating means, a pair of electric motors connected in series with said generating means and operatively connected to said output member for supplying torque thereto, and means operable in accordance with a predetermined minimum speed of rotation of said motors to place said motors in parallel across said generating means.

9. In a variable torque power transmission system, torque dividing means having rotatable input and output members and a rotatable torque controlling member, an electric generating means rotatable by said torque-controlling member, means controlling the output of said generating means whereby the product of its output voltage and current is maintained substantially constant above a predetermined speed irrespective of changes in the speed of rotation of said generating means, a pair of electric motors connected in series with said generating means and operatively connected to said output member for supplying torque thereto, and means operable in accordance with a predetermined minimum voltage across one of said motors to place said motors in parallel across said generating means.

10. In a motor vehicle drive, a differential mechanism having rotatable power input and output members and having a rotatable torque controlling member, an electric power-generating means rotatable by said torque-controlling member, electric motor means driven by said generating means and operable to supply power to said output member, means controlling the torque required to drive said generating means whereby the torque supplied to said output member by said input member may be controlled, one-way engageable means operatively associated with said input member in said differential mechanism effective to couple said input and output members in one-way drive and means including governor means operable above a predetermined speed of rotation of said output member for de-energizing said generating means and comprising a clutch operatively associated with said governor means and input member for mechanically locking said differential mechanism whereby said input member is coupled to said output member.

11. In a motor vehicle drive, a differential mechanism having a rotatable power input member adapted to be driven by a power source and having an output member adapted to drive the vehicle and having a rotatable torque controlling member, an electric power-generating means rotatable by said torque-controlling member, means energizing said generating means and having automatic means effective to control it automatically for maintaining a predetermined maximum output from the generating means, electric motor means driven by output of said generating means and operable to supply power to said output member, means controlling the power delivered by the power source, and means operable by said source controlling means for rendering said automatic control and energizing means ineffective.

12. In a motor vehicle drive, a differential mechanism having a rotatable power input member adapted to be driven by a power source and having an output member adapted to drive the vehicle and having a rotatable torque-controlling member, and electric power-generating means rotatable by said torque-controlling member, means energizing said generating means, electric motor means driven by said generating means and operable to supply power to said output member, means controlling the power delivered by the power source, means operable to couple said input member to said output member whereby said torque-controlling member is rendered ineffective, and means operable by said source controlling means for rendering said energizing means ineffective and for rendering said coupling means effective.

13. In a motor vehicle drive, a differential mechanism having a rotatable power input member adapted to be driven by a power source and having an output member adapted to drive the vehicle and having a rotatable torque-controlling member, an electric power-generating means rotatable by said torque-controlling member, controlled means energizing said generating means, electric motor means driven by said generating means and operable to supply power to said output member, means including an accelerator controlling the power delivered by the power source, means operable to couple said input member to said output member whereby said torque-controlling member is rendered ineffective, accelerator operated switch mechanism having a position of control permitting controlled energization of said generating means and effective to permit operation of said coupling means, and means operable in accordance with the speed of said output member for rendering said energizing means ineffective and for rendering said coupling means operable.

14. In a power-transmitting system, a planetary-type gear train having an input member adapted to be driven by a source of power and an output member adapted to drive a load and a member driven by the reactive torque of said gear train, means driven by said driven member and operable to drive said output member by establishing therethrough a flow of power extracted from the former and delivered to the latter, means controlling the power delivered by the power source, means for coupling the input member and output member for one-way drive in cooperation with said power flow means and means operable by said source controlling means for directly coupling the input member and output member and for substantially simultaneously disrupting the flow of power extracted from the driven member and delivered to the output member.

15. In a power-transmitting system, a planetary-type gear train having an input member adapted to be driven by a source of power and an output member adapted to drive a load and a member driven by the reactive torque of said gear train, means driven by the driven member and operable to drive the output member, means for coupling the input member and output member for one-way drive in drive cooperation to the driving relation between the drive member and the output member, and means for directly coupling the input member and output member for substantially simultaneously rendering ineffective the driving relation between the driven member and the output member.

16. In a power-transmitting system, a planetary-type gear train having an input member adapted to be driven by a source of power and an output member adapted to drive a load and a member driven by the reactive torque of said gear train, accelerator means for controlling the output of said source of power, means driven by the driven member and operable to drive the output member, and accelerator operated switch means including a governor operable above a predetermined speed of said output member for directly coupling the input member and output member and for rendering ineffective the driving relation between the driven member and the output member.

17. In a power-transmitting system, a planetary-type gear train having an input member adapted to be driven by a source of power and an output member adapted to drive a load and a member driven by the reactive torque of said gear train, means driven by the driven member and operable to drive the output member, means controlling the power delivered by the power source, means operable in response to the assumption of a preselected position by said source controlling means for directly coupling the input member and the output member and for rendering ineffective the driving relation between the driven member and the output member, and means for preventing operation of the last mentioned means below a certain speed of the output member.

18. In a power-transmitting system, a planetary-type gear train having an input member adapted to be driven by a source of power and an output member adapted to drive a load and a member driven by the reactive torque of said gear train, means driven by the driven member and operable to drive the output member, means including an accelerator for controlling the output of said source of power means for directly coupling the input member and the output member and for rendering ineffective the driving relation between the driven member and the output member and including accelerator operated switch mechanism, and means for preventing operation of the last mentioned means below a certain speed of the output member.

19. In a power-operated wheeled vehicle, the combination with an engine and an accelerator pedal depressable from an idle position to increase the flow of fuel to the engine; of a change-speed transmission for driving the vehicle wheels from the engine, comprising an input member driven by the engine, an output member drivingly connected with the wheels, means including a rotatable torque exerting member operatively interconnecting said members so as to cause said input member to drive said output member and to exert a reaction torque on said exerting member proportional to the torque exerted onto the output member, means for exerting a torque on said exerting member in opposition to said reaction torque, means for applying power from said reaction torque to said output member, and means responsive to release of the accelerator pedal to idle position to couple directly the input and output members and to render said torque exerting means ineffective and responsive to depression of the accelerator pedal to an extreme position to uncouple the input and output members and to render effective said torque-exerting means.

20. In a power-operated wheeled vehicle, the combination with an engine and an accelerator pedal depressable from an idle position to increase the flow of fuel to the engine; of a change-speed transmission for driving the vehicle wheels from the engine, comprising an input member driven by the engine, an output member drivingly connected with the wheels, means including a rotatable torque exerting member operatively interconnecting said members so as to cause said input member to drive said output member and to exert a reaction torque on said exerting member proportional to the torque exerted on to the output member, means for exerting a torque on said exerting member in opposition to said reaction torque, means for applying power from said reaction torque to said output member, means responsive to release of the accelerator pedal to idle position to couple directly the input and output members and to render said torque exerting means ineffective and responsive to depression of the accelerator pedal to an extreme position to uncouple the input and output members and to render effective said torque-exerting means, and speed-responsive means for preventing release of the accelerator pedal to idle position from coupling the input and output members and rendering the torque-exerting means ineffective below a predetermined speed of the output member.

21. In a power-operated wheeled vehicle, the combination with an engine and an accelerator pedal depressable from an idle position to increase the flow of fuel to the engine; of a change-speed transmission in the form of a planetary type gear train for driving the vehicle wheels from the engine comprising an input member driven by the engine, an output member drivingly connected with the vehicle wheels, a member driven by the reactive torque of said gear train, means driven by said driven member and operable to drive said output member, and means responsive to release of the accelerator pedal to idle position to couple directly the input and output members and to render ineffective the driving relation between the driven member and output member and responsive to depression of the accelerator pedal to an extreme position to uncouple the input and output members and to render effective the driving relation between the driven member and the output member.

22. In a power transmitting system, an input member arranged to be driven by a source of power, an output member adapted to deliver power, means including a rotatable torque exerting member operatively interconnecting said members whereby said input member drives said output member and exerts a reaction torque on said exerting member proportional to the torque applied to said output member, means for exerting a torque on said exerting member in opposition to said reaction torque and including dynamo energization circuit means and load circuit means, a first controlling means including an accelerator adapted to regulate the output of the source of power, and a second controlling means including accelerator operated switch mechanism interconnected for operation with said first controlling means and operable in one position for opening at least one of said circuit means to render said exerting means ineffective.

23. In a power transmitting system, an input member arranged to be driven by a source of power, an output member adapted to deliver power, means including a rotatable torque exerting member operatively interconnecting said members whereby said input member drives said output member and exerts a reaction torque on said exerting member proportional to the torque applied to said output member, means for exerting a torque on said exerting member in opposition to said reaction torque and having switch means for operating it, mechanical means operable to couple said output member to said input member, and actuating means for said mechanical means and having a switch means for operating it, a controlling means adapted to regulate the output of the source of power and said torque exerting means and comprising an accelerator, said controlling means having a first position and a second position, and accelerator operated switch mechanism for operating said switch means, said controlling means when in said first position being operable for operating said torque exerting means switch means to render said torque exerting means ineffective and when in said second position being operable for operating said actuating means switch means and torque exerting means switch means respectively to render said mechanical means ineffective and said torque exerting means effective.

24. In a motor vehicle drive, a differential mechanism having a power input member adapted to be driven by a power source and having an output member adapted to drive the vehicle and having a rotatable torque controlling member, electrically energizeable means operable to couple said output member to said input member whereby said controlling member becomes ineffective, means regulating said torque controlling member, and means having two operating positions and operable to control the power delivered by the power source and to activate said regulating means and said coupling means, said last named means being operable in one of said positions to maintain the power delivered by said source at a low value and to maintain said regulating means effective and to prevent said coupling means from being energized, said last named means being operable in the other of said positions to maintain the power delivered by said source at a high value and to render said regulating means ineffective and to permit said coupling means to be electrically energized.

PAUL T. NIMS.

REFERENCES CITED

The following references are of record in the file of this patent:

UNITED STATES PATENTS

| Number | Name | Date |
|---|---|---|
| 948,436 | Thomas | Feb. 8, 1910 |
| 968,290 | Thomas | Aug. 23, 1910 |
| 1,242,974 | Pinckney | Oct. 16, 1917 |
| 1,762,004 | Wellman | June 3, 1930 |
| 1,772,473 | Winther | Aug. 12, 1930 |
| 1,782,001 | Crichton | Nov. 18, 1930 |
| 1,784,524 | Jensen | Dec. 9, 1930 |
| 1,855,222 | Chase | Apr. 26, 1932 |
| 2,000,465 | Higley | May 7, 1935 |
| 2,000,786 | Neuland | May 7, 1935 |
| 2,018,336 | Weichsel | Oct. 22, 1935 |
| 2,045,197 | Neuland | June 23, 1936 |
| 2,056,783 | Franz | Oct. 6, 1936 |
| 2,085,763 | Neuland | July 6, 1937 |
| 2,172,298 | Sousedik | Sept. 5, 1939 |
| 2,174,662 | Josephs | Oct. 3, 1939 |
| 2,209,641 | Weber | July 30, 1940 |
| 2,258,005 | Durdin | Oct. 7, 1941 |

FOREIGN PATENTS

| Number | Country | Date |
|---|---|---|
| 558,334 | France | Apr. 25, 1923 |

Certificate of Correction

Patent No. 2,571,284                                              October 16, 1951

PAUL T. NIMS

It is hereby certified that error appears in the printed specification of the above numbered patent requiring correction as follows:

Column 11, line 3, before "for" insert *and*;

and that the said Letters Patent should be read as corrected above, so that the same may conform to the record of the case in the Patent Office.

Signed and sealed this 5th day of February, A. D. 1952.

[SEAL]

THOMAS F. MURPHY,
*Assistant Commissioner of Patents.*